April 9, 1957 R. H. HALLMAN 2,787,887
POWER TRANSMISSION
Filed Jan. 3, 1956
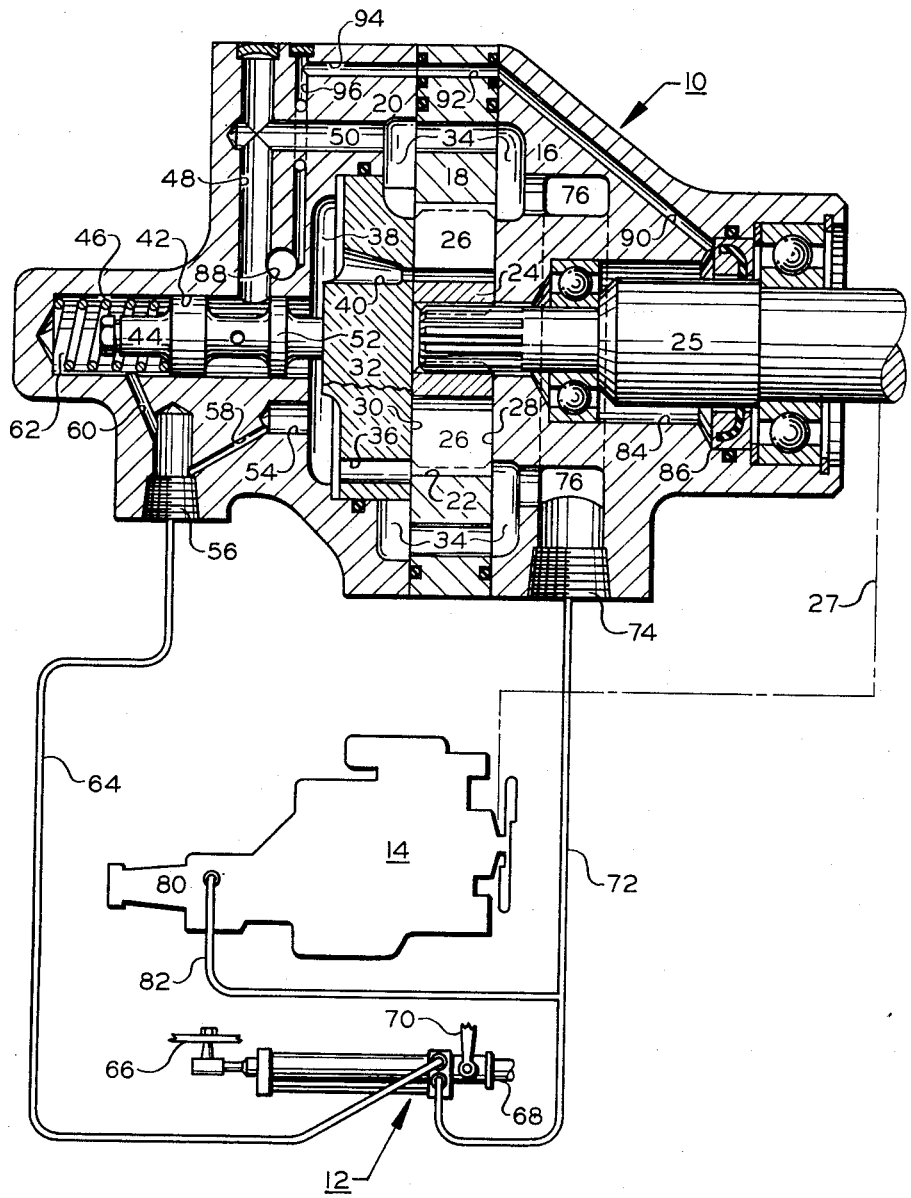
INVENTOR.
RUSSELL H. HALLMAN
BY Van Peter and George
ATTORNEYS United States Patent Office 2,787,887
Patented Apr. 9, 1957

2,787,887

POWER TRANSMISSION

Russell H. Hallman, Royal Oak, Mich., assignor to Vickers Incorporated, Detroit, Mich., a corporation of Michigan Application January 3, 1956, Serial No. 557,107

2 Claims. (Cl. 60—52)

This invention relates to power transmissions, and is particularly applicable to those of the type comprising two or more fluid pressure energy translating devices, one of which may function as a pump and another as a fluid motor.

More particularly the invention relates to an improved closed circuit power transmission, in which the pump inlet zones are supercharged, which has reduced external leakage and longer pump shaft seal life.

Where pumping units are operated at high speeds it has been found desirable to increase the pressure at the pump inlet zones to a point above atmospheric. This is because the suction, or intake, phase of the cycle is of such short duration that the expanding working chambers do not fill properly with only atmospheric pressure available to urge fluid into the chambers.

It has become common practice to provide a "closed circuit" in which the pump and motor are connected by delivery and return conduits and the motive fluid follows an essentially closed path from the pump outlet to the motor inlet and from the motor outlet to the pump inlet. An auxiliary source of fluid pressure is then connected to the return line so as to increase the pressure therein to some desired, higher-than-atmospheric pressure, for example, 50 pounds per square inch. The auxiliary pressure source normally supplies only such quantities of fluid to the closed circuit as are necessary to replenish leakage losses and temporary make-up requirements, as where a differential motor is employed.

Such systems have proven highly successful in eliminating "cavitation," or inadequate filling of the expanding chambers. These prior systems have had one serious drawback, however. When the pump inlet is supercharged, normally the minimum pressure in any of the fluid filled cavities of the pump will be substantially equal to supercharge pressure. The pump shaft must extend from one of these cavities and must be sealed against leakage. Thus, in the past, the shaft seal was required to seal against a large pressure differential, or else the shaft cavity had to be externally drained to atmospheric pressure. Either of these alternatives had disadvantages. If the seal operated against a large differential, external leakage was increased and seal life was substantially reduced. If the shaft cavity was externally drained back to the fluid reservoir, an extra conduit to the pump was required, thus adding substantially to the cost of the system and complicating the installation and maintenance.

It is an object of this invention to provide an improved, supercharged, closed circuit fluid transmission in which the external leakage is reduced and shaft seal life is increased.

It is a further object to provide such a power transmission in which the only external fluid connections to the pump are a delivery and a return conduit.

Further objects and advantages of the present invention will be apparent from the following description, reference being had to the accompanying drawing wherein a preferred form of the present invention is clearly shown.

In the drawing, the single figure illustrates a power transmission embodying a preferred form of the present invention in which the pumping mechanism is shown in cross section.

In the drawing there is shown a pump, generally designated 10, a fluid motor generally designated 12, and an internal combustion engine and automatic transmission generally designated 14. The pump 10 includes a body member 16, a ring 18 and a head member 20. Ring 18 includes a contoured bore 22 in which is telescopically disposed a rotor 24. Rotor 24 is engaged and supported by a drive shaft 25. Shaft 25 extends to the exterior of the pump to a driving connection with the variable speed prime mover 14. This driving connection is schematically indicated at 27. Rotor 24 is radially slotted to receive a plurality of vanes 26 which extend from the rotor 24 to engage the contoured bore 22 during operation of the device. A plane face 28 of body member 16 axially abuts one side of rotor 24 and vanes 26 and a plane face 30 of a pressure plate 32 abuts the opposite side. Axially opposed inlet ports 34 communicate with the expanding intervane chambers and outlet ports 36 extend through the pressure plate 32 to effect communication between the contracting intervane chambers and a pressure chamber 38. Pressure from chamber 38 is conducted to the underside of the vanes 26 through passages 40 in pressure plate 32. The pumping mechanism thus far described is conventional in nature, and described in greater detail in prior art patents such as Gardiner et al., No. 2,544,988, for example.

A valve bore 42 extends axially into the head member 20 to communicate with the pressure chamber 38. A flow control valve 44 is slidably mounted in bore 42 and biased by a spring 46 to the position illustrated. Bore 42 is transversely intersected by a by-pass passage 48 which communicates with an axial passage 50 leading to the pump inlet ports 34. In the position illustrated, a land 52 on valve spool 44 blocks communication between pressure chamber 38 and the by-pass passage 48. The valve spool 44 is shiftable to establish communication between pressure chamber 38 and by-pass passage 48, as hereinafter described.

A delivery passage 54 extends from the pressure chamber 38 to communicate with an external connection port 56. Passage 54 includes a metering restriction 58. A pressure sensing passage 60 extends from the port 56 to communicate with the spring chamber 62 of valve bore 42. The valve spool 44 thus has equal and opposed areas exposed to pressure upstream and downstream of the metering restriction 58. The spring 46 will maintain the valve 44 in the illustrated position until flow across metering restriction 58 creates a pressure differential which, reacting on the opposed areas of spool 44 will overcome the spring 46. Spool 44 will then shift to the left, establishing communication between pressure chamber 38 and by-pass passage 48. At all pump speeds above the cracking point of the valve 44 a proper quantity of fluid will be by-passed from chamber 38 to maintain the pressure drop across metering restriction 58 substantially constant, and thus maintain the quantity of fluid delivered to the external connection port 56 substantially constant.

A delivery conduit 64 extends from the external connection port 56 to the inlet of a servo valve and fluid motor represented by steering booster 12. Steering booster 12 may be of the type described in the patent to H. F. Vickers, No. 2,022,698. Booster 12 is fixed to the vehicle frame at 66 and connected into the steering linkage by a drag link 68. Steering movement of the vehicle pitman arm 70 shifts the open center servo valve to effect actuation of the booster. A return line 72 extends from the outlet port of booster 12 to an external return connection port 74 in the body 16 of pump 10. Return port 74 communicates, through a cored passage 76, with the pump inlet ports 34.

To prevent cavitation in the inlet zones of the pumping mechanism 10, a source of supercharging pressure is applied to the return line 72. In the illustrated embodiment, the supercharge pressure is provided by a control pump in the automatic transmission 80. A supercharging conduit 82 extends from the source of pressure within the transmission to the return conduit 72. This pressure may be of the order of 50 pounds per square inch. In such an arrangement the sump of the automatic transmission forms the fluid reservoir for the steering system. Utilization of the automatic transmission as a supercharge pressure source is merely by way of example, and any other suitable pressure source, such as the engine lubricating oil pump might also be used.

The pump body 16 includes a shaft cavity 84 through which the drive shaft extends to engage rotor 24. The conventional shaft seal 86 surrounds the shaft to prevent leakage of fluid from the shaft cavity to the exterior of the pump. In the normal closed system the pump shaft seal is exposed to supercharge pressure. Since this pressure may be of the order of 50 pounds per square inch, it will be apparent that the shaft seal operates under very severe conditions, as contrasted to a shaft seal in an unsupercharged system. The present invention greatly improves shaft seal life and reduces external leakage by lowering the pressure differential across the shaft seal.

By-pass passage 48 is intersected transversely by a passage 88 which breaks through the side of passage 48 at a point proximate to the intersection between passage 48 and bore 42. As heretofore noted, land 52 of valve 44 controls communication between pressure chamber 38 and passage 48, at the juncture between bore 42 and passage 48. Since pressure in chamber 38 is normally high relative to the pressure in passage 48, and the balance of the pump inlet zones, a high velocity jet of by-passed fluid will be directed into passage 48 when valve 44 opens. Due to the location of passage 88, this high velocity jet of by-passed fluid will spurt directly across the intersection between passage 88 and passage 48. In accordance with well known physical principles, the high velocity of the jet is accompanied by a relatively low static pressure. Thus pressure in passage 88 will be reduced below the pressure in the remainder of the pump inlet passages.

Shaft cavity 84 is connected to passage 88 by passages 90, 92, 94, and 96. Pressure in shaft cavity 84 will thus be reduced to that low pressure in passage 88 produced by the velocity effect of the by-passed fluid. The pressure differential across seal 86 is reduced, insuring longer life and greatly reduced external leakage.

There has thus been provided an improved supercharged closed circuit fluid transmission having only two external pump connections and in which shaft seal life is greatly increased and external leakage is greatly reduced.

While the form of embodiment of the invention as herein disclosed constitutes a preferred form, it is to be understood that other forms might be adopted, all coming within the scope of the claims which follow.

What is claimed is as follows:

1. In a fluid power transmission of the closed circuit type having a pump, a variable speed prime mover driving the pump, a motor, delivery and return lines interconnecting the pump and the motor, flow controlling means for maintaining a substantially constant flow to the motor by by-passing fluid from the delivery line to the return line, means for maintaining a supercharge pressure in the return line to the pump, a shaft cavity in the pump, a shaft extending from the cavity to the exterior of the pump, and shaft sealing means surrounding the shaft to prevet leakage from the shaft cavity, that improvement comprising: means for utilizing the velocity effect of the by-passed fluid to maintain the pressure in the shaft cavity at a lower value than said supercharge pressure.

2. In a fluid power transmission of the closed circuit type having a pump, a variable speed prime mover driving the pump, a motor, delivery and return lines interconnecting the pump and the motor, flow controlling means for maintaining a substantially constant flow to the motor by by-passing fluid from the delivery line to the return line, said means comprising a valve which, on opening, produces a jet of by-passed fluid, means for maintaining a supercharge pressure in the return line to the pump, a shaft cavity in the pump, a shaft extending from the cavity to the exterior of the pump, and shaft sealing means surrounding the shaft to prevent leakage from the shaft cavity, that improvement comprising: means for utilizing the velocity effect of said jet of by-passed fluid to maintain the pressure in the shaft cavity at a lower value than said supercharge pressure.

References Cited in the file of this patent

UNITED STATES PATENTS

| | | |
|---|---|---|
| 1,474,454 | Telfer | Nov. 20, 1923 |
| 2,739,446 | Godsil | Mar. 27, 1956 |

FOREIGN PATENTS

| | | |
|---|---|---|
| 724,892 | Great Britain | Nov. 5, 1953 |